(12) United States Patent
Patel et al.

(10) Patent No.: US 10,938,673 B2
(45) Date of Patent: *Mar. 2, 2021

(54) AUTOMATED SLA NON-COMPLIANCE DETECTION AND PREVENTION SYSTEM FOR BATCH JOBS

(71) Applicant: Tata Consultancy Services Limited, Mumbai (IN)

(72) Inventors: Alok Patel, Pune (IN); Veerendra Kumar Rai, Pune (IN); Abhinay Puvvala, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 34 days.

This patent is subject to a terminal disclaimer.

(21) Appl. No.: 16/103,606

(22) Filed: Aug. 14, 2018

(65) Prior Publication Data

US 2019/0052547 A1 Feb. 14, 2019

(30) Foreign Application Priority Data

Aug. 14, 2017 (IN) .............................. 201721028919

(51) Int. Cl.
*H04L 12/24* (2006.01)
*G06F 11/34* (2006.01)
*G06F 11/07* (2006.01)

(52) U.S. Cl.
CPC ........ *H04L 41/5025* (2013.01); *G06F 11/079* (2013.01); *G06F 11/3414* (2013.01); *H04L 41/5009* (2013.01)

(58) Field of Classification Search
CPC ............. H04L 41/5025; H04L 41/5009; G06F 11/3414; G06F 11/079; G06F 11/0715; G06F 11/0757; G06F 11/3409; G06F 11/3466; G06F 2201/865; G06F 11/3017; G06F 11/302

USPC ......................................................... 709/223
See application file for complete search history.

(56) References Cited

U.S. PATENT DOCUMENTS

| | | | |
|---|---|---|---|
| 6,701,342 B1 * | 3/2004 | Bartz ................. | H04L 41/5003 370/395.21 |
| 7,668,741 B2 * | 2/2010 | Ernest .................... | G06Q 10/06 705/7.11 |
| 7,725,570 B1 * | 5/2010 | Lewis .................... | G06Q 10/04 709/224 |
| 9,319,281 B2 | 4/2016 | Yotsutani et al. | |

(Continued)

*Primary Examiner* — Moustafa M Meky
*Assistant Examiner* — Elizabeth Kassa
(74) *Attorney, Agent, or Firm* — Finnegan, Henderson, Farabow, Garrett & Dunner, L.L.P.

(57) ABSTRACT

A method and system is disclosed herein for detecting one or more violations in managing service level agreements (SLA) in an information technology service management (ITSM). A batch job system is characterized by the set of jobs and dependencies between jobs. Each job is in turn characterized by run-time, from-time and SLA definitions. SLAs can be of two kinds Start-time and End-time. Start-time SLA requires that the job execution starts before the specified time while End-time SLA necessitates that the job finishes its execution before the specified time. To optimize processing time required for executing one or more batch jobs the disclosure identifies SLA violations and solves them to produce a set of actionable levers.

12 Claims, 3 Drawing Sheets

(56) References Cited

U.S. PATENT DOCUMENTS

| | | | |
|---|---|---|---|
| 2007/0234363 A1* | 10/2007 | Ferrandiz | G06F 9/4843 |
| | | | 718/101 |
| 2014/0122706 A1* | 5/2014 | Boerner | H04L 41/5096 |
| | | | 709/224 |
| 2015/0277987 A1* | 10/2015 | Di Balsamo | G06F 9/5083 |
| | | | 718/104 |
| 2016/0170800 A1* | 6/2016 | Di Balsamo | G06F 9/4887 |
| | | | 718/104 |
| 2016/0253208 A1* | 9/2016 | Kumar | G06F 11/1402 |
| | | | 717/102 |
| 2018/0316577 A1* | 11/2018 | Freeman | H04L 41/5019 |

* cited by examiner

AUTOMATED SLA NON-COMPLIANCE DETECTION AND PREVENTION SYSTEM FOR BATCH JOBS

PRIORITY CLAIM

This U.S. patent application claims priority under 35 U.S.C. § 119 to India Application No. 201721028919, filed on Aug. 14, 2017. The entire contents of the abovementioned application are incorporated herein by reference.

TECHNICAL FIELD

The embodiments herein generally relates to a system and method for detecting one or more violations in managing service level agreements, and more particularly systems and methods for generating a set of levers corresponding to minimize SLA violation.

BACKGROUND

The present subject matter described herein, in general, relates to systems and methods for detecting one or more violations in managing service level agreements, and more particularly systems and methods for generating a set of levers corresponding to minimize SLA violation.

In modern day organizations, the underlying IT for most business processes has to be tuned to perform high volume, repetitive tasks/jobs that require little to no manual intervention. While online systems can potentially handle such requirements, they are not typically optimized and may hence prove costly. Besides, most of these tasks/jobs need not be handled in real time. As a result, Batch systems have become ubiquitous in the enterprise IT of every organization. Clearly, the name, batch systems, comes from the mode of processing execution of jobs (batch) in a sequence. Data integration, compliance checks, analytics, reporting, billing and image processing jobs are some examples of Batch applications.

Typically, a batch system is characterized by jobs and the precedence relations between jobs. Business processes (streams) are broken down into smaller series of steps referred to as jobs. Each job can only start after its predecessors have completed their execution. Business requirements dictate these precedence relations between jobs. In addition, business requirements enforce various other constraints such as start-time, criticality, batch completion time etc. These constraints are described in greater detail in subsequent sections.

Another vital aspect of batch systems is Service Level Agreements (SLAs). The SLAs are defined by temporally measuring the start and end of business critical jobs and processes. To fulfill the business requirement, SLAs are defined for each batch process separately. However, spikes in workload, inadequately provisioned computational capacity along with many other reasons often lead to SLA violations. The onus is on the system administrators to handle such scenarios and ensure that SLA violations are minimized. To do so, it is essential to not only predict potential SLA violations but also to identify the right set of levers that can be used to minimize SLA non-compliances.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and a method for detecting one or more violations in managing service level agreements (SLA) in an information technology service management (ITSM).

In one aspect, a system for detecting one or more violations in managing service level agreements (SLA) in an information technology service management (ITSM). The system comprising a memory and a processor communicatively coupled with memory. Further, the system comprises a receiving module to receive one or more constraints of a business, a run history data and one or more SLA definitions of each job of the business. Further, the system includes a processing module to process the received one or more inputs to create a profile and predecessor list of each job of the business and a generation module to generate a dependency graph of each job using the created profile and predecessor list of each job. Further, a computing module of the system to compute reach-time of each job and based the computed reach-time of each job one or more violations are detected. The system also comprises an optimization module to generate a set of levers corresponding to each detected violation using an integer linear programming technique and the output of processing module for optimizing batch processing time of the given business.

In yet another aspect, a method for detecting one or more violations in managing service level agreements (SLA) in an information technology service management (ITSM). The method comprises one or more steps such as receiving one or more constraints of a business, a run history data and one or more SLA definitions of each job of the business. In the next step a processing module is used to process the received one or more inputs to create a profile and predecessor list of each job of the business and a generation module to generate a dependency graph of each job using the created profile and predecessor list of each job. Further, it computes reach-time of each job and based the computed reach-time of each job one or more violations are detected. An optimization module of the system is used to generate a set of levers corresponding to each detected violation using an integer linear programming technique and the output of processing module for optimizing batch processing time of the given business.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
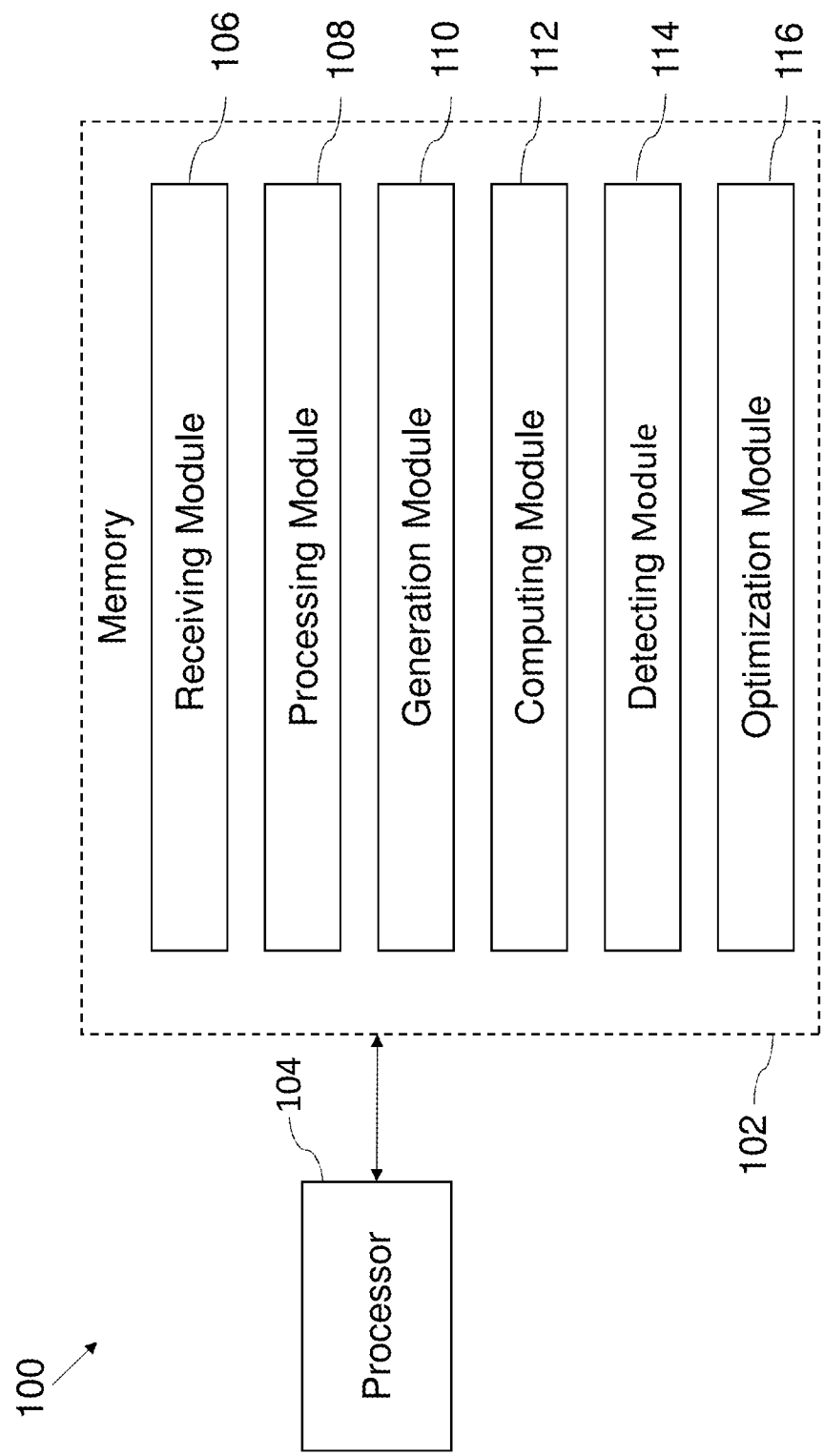
FIG. 1 is a block diagram showing a system for detecting one or more violations in managing service level agreements (SLA) in an information technology service management (ITSM) according to an embodiment of the present disclosure.

Some embodiments of this disclosure, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. In the following description for the purpose of explanation and understanding reference has been made to numerous embodiments for which the intent is not to limit the scope of the disclosure.

One or more components of the disclosure are described as module for the understanding of the specification. For example, a module may include self-contained component in a hardware circuit comprising of logical gate, semiconductor device, integrated circuits or any other discrete component. The module may also be a part of any software program executed by any hardware entity for example processor. The implementation of module as a software program may include a set of logical instructions to be executed by a processor or any other hardware entity.

The disclosed embodiments are merely exemplary of the disclosure, which may be embodied in various forms.

The elements illustrated in the figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

Method steps of the disclosure may be performed by one or more computer processors executing a program tangibly embodied on a computer-readable medium to perform functions of the disclosure by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk In view of the foregoing, an embodiment herein provides a system and a method for detecting one or more violations in managing service level agreements (SLA) in an information technology service management (ITSM). A business processes of the ITSM are broken down into series of steps referred to as one or more jobs. Each job can only start after its predecessors have completed their execution. The business requirements define theses precedence relations among one or more jobs. In addition, the business requirement entail various constraints such as start-time, run-time, end-time etc.

In a complex business there could be multiple objectives such as efficiency, cost, compliance etc. In a systematic settings these objectives are often intertwined and there is a trade-off in meeting them. The service level agreements (SLAs) are very vital to the business processes of the ITSM. Herein, the SLAs are defined by measuring the start-time, run-time and end-time of each job of the business.

Referring FIG. 1, a system (100) for detecting one or more violations in managing service level agreements (SLAs) in an information technology service management (ITSM). The system comprising a memory (102) and a processor (104) communicatively coupled with the memory. Further, the system (100) comprises a receiving module (106), a processing module (108), a generation module (110), a computing module (112), a detection module (114) and an optimization module (116). Herein, to fulfill the business requirement, one or more SLA violations of each job of the business processes are being detected and a set of levers are identified that can be used to minimize the detected SLA violations of each job.

In the preferred embodiment of the disclosure, the receiving module (106) of the system (100) is configured to receive one or more constraints of the business, a run history data and one or more SLA definitions of each job of the business. It would be appreciated that the received one or more constraints of the business, a run history data and one or more SLA definitions of each job are considered as one or more inputs to the system (100). The one or more business constraints are generally derived from the jobs relationships and requirements. A typical business constraint could be something like a job can start only after its defined from-time. Further, a job can start only after all its predecessors are completed etc. if the job or dependency among the one or more jobs is defined as constraint then it cannot be perturbed.

The run history data comprises of start-time, end-time, from-time, and run-time of each job. The start-time of the job is the time when the job execution starts while the end-time of the job is the time when the job execution ends. The from-time of each job is a constraint that restricts the start-time of the job and the run-time is the amount of time taken to complete the job execution. The run history data are very important for efficient and feasible scheduling the one or more jobs in the ITSM.

Figure 2:
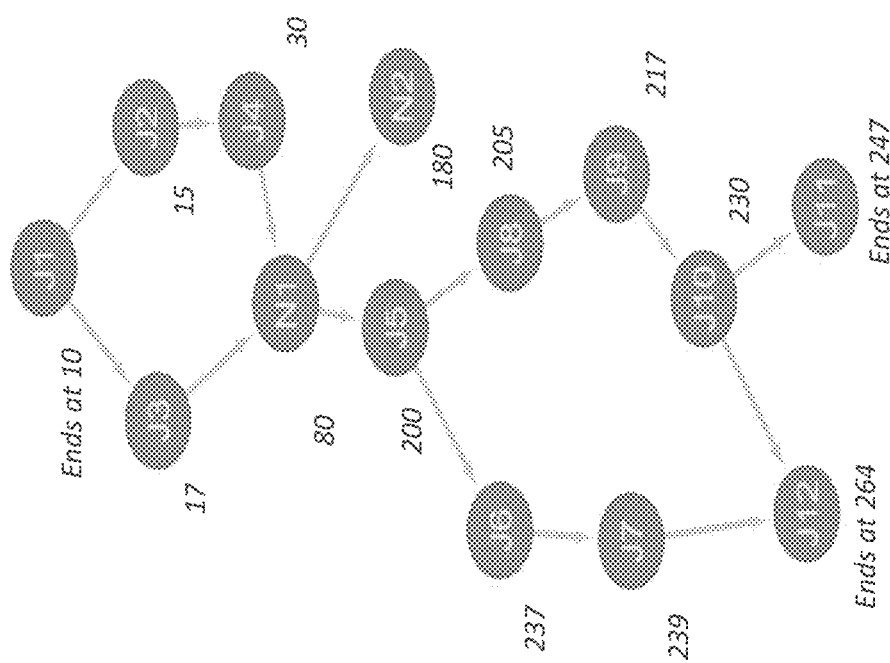
FIG. 2 is a schematic diagram of a predecessor list of one or more jobs and dependency of the same in an information technology service management (ITSM) according to an embodiment of the present disclosure.

In the preferred embodiment of the disclosure, the processing module (108) of the system (100) is configured to process the received one or more inputs to create a profile and predecessor list of each job. The processing module (108) filters the received data sets to ensure data consistency, completeness and uniformity. The profile of each job is the collection of individual characteristics of each job that are useful in scheduling. Each job profile includes job name, run-time, from-time criticality and SLAs. The predecessor list of each job represents the dependencies among the one or more jobs as shown in FIG. 2. Each job can only start executing if all of its predecessor jobs are executed. It represents the relationship among the one or more jobs.

In the preferred embodiment of the disclosure, a generation module (110) of the system (100) is configured to generate a dependency graph of each job using the created profile and predecessor list of each job. In the dependency graph each node represents a job and an edge represents the precedence relationship.

In the preferred embodiment of the disclosure, the computing module (112) of the system (100) is configured to compute reach-time of each job. It is to be noted that the reach-time is defined as the earliest time epoch where a job can start execution.

In the preferred embodiment of the disclosure, the detection module (114) of the system (100) is configured to detect one more violations based the computed reach-time of each job. The system (100) uses transactional history to derive a from-time constraint for identified root-nodes and identifies at least one job that is likely to be SLA non-compliant using the computed reach-time and the dependency graph of each job. Further, the system (100) compares reach-time and run-time of the each job with SLA definitions (start-time SLA and end-time SLA) to identify potential SLA violations.

In the preferred embodiment of the disclosure, the optimization module (116) of the system (100) is configured to generate a set of levers corresponding to each identified violation using an integer linear programming (ILP) technique and the output of processing module (108). It would be appreciated that the integer linear programming technique is a mathematical model which is applied wherein the objective and its constraints are linear, and decision variables are integer. Herein, objective is to optimize SLA non-compliance with minimal impact on business logic.

In one example, a Python-PuLP integer linear program is being used to create an optimizer consumable input format (.lp file). There are so many solvers available to solve the ILP formulations and the present disclosure is not limited only to the Python-PuLP integer linear program. It would be noted that Python-PuLP integer linear program is being used only for illustration purpose. The created LP file is passed to the optimization solver to obtain the optimal solution. A CBC solver is being used to obtain optimal solutions of the created LP file. It is to be noted that the present disclosure is not limited to the CBC solver though it can use other proprietary solvers such as Cplex, Gurobi, etc. to obtain the optimal solutions.

In yet another example, where a mathematical model is configured to optimize SLA non-compliances with minimal system perturbation. Therefore, the objective function defines two parts as to first part (SLAnonCompliances) takes care of the SLA non-compliances and second part (System-Pertubation) ensures minimum system perturbations.

$$\text{Minimize}([SLAnonCompliances] + [SystemPertubation])$$

$$\text{Minimize}\left[M * \sum_j (axz_j + s_j)\right] +$$

$$\left[\sum_j \sum_{k \in PL(j)} (-y_{jk}) + \sum_j -(x_j + \text{cnt\_pr}_j + rft_j)\right]$$

In one aspect, the function (SLAnonCompliances) has two types of SLA non compliances as to end-time SLA non-compliances ($axz_j$) and start-time SLA non-compliances ($s_j$). A very large number 'M' is multiplied to (SLAnonCompliances) that ensures that the model will minimize the non-compliances whenever feasible.

In yet another aspect, the function (SystemPertubation) has four levers (delete a job ($x_j$), delete a dependency ($y_{jk}$), reduce run-time/workload ($pr_j$) and reduce from-time ($rft_j$) to achieve the objective. It is to be noted that the model uses these levers as minimum as possible to minimize the SLA non-compliances. It would be appreciated that the model has to be used to obtain optimal set of levers that minimizes SLA non-compliances while considering following constraints.

Sacrosanct Constraints:

There are few business critical jobs or dependencies, which cannot be altered. Constraints 1 ensures that the system cannot delete a business critical job from the current batch or reduce its workload or run-time. Constraint 2 puts bound on run-time reduction of a job. Constraint 3 ensures that no business critical dependencies are deleted.

$$pr_j=1, rst_j=0 \text{ and } x_j=1, \forall j \in cj \text{ (critical jobs cannot be deleted)} \quad (1)$$

$$pr_j \leq x_j, \forall j \text{ (puts bound on 'run-time' reduction of a job)} \quad (2)$$

$$y_{jk}=1, \forall e(j,k) \in cE \text{ (critical dependencies cannot be removed)} \quad (3)$$

Reach-Time Constraint:

The system defines reach-time (Reachtime$_j$) of a job j as the earliest time epoch, when the job j can be started executing. Constraint 4 ensures that the job j can start executing after it's from-time only. Constraint 5 makes sure that the job j can start executing only after all its predecessor jobs are executed.

$$\text{Reachtime}_j + M^*(1-x_j) \geq ft_j - rst_j, \forall j \quad (4)$$

$$\text{Reachtime}_j + M^*(1-x_j) \geq rty_jk + (rt_k * ayp_{jk}), \forall j \text{ and } k \in PL(j) \quad (5)$$

SLA Non-Compliant Identifier Constraints:

Constraints 6 and 7 ensures that when a job j violates end-time SLA ($et_j$), it is registered through the decision variable $z_j$. Similarly, constraints 8 and 9 ensures start-time SLA ($st_j$) violation is recorded in variable $s_j$.

$$et_j * z_j < \text{reachtime}_j + (rt_j * pr_j) + M^*(1-x_j), \forall j \quad (6)$$

$$\text{reachtime}_j + (rt_j * pr_j) - M^*(1-x_j) \leq et_j*(z_j+1) + M^*z_j, \forall j \quad (7)$$

$$st_j * s_j < \text{reachtime}_j + M^*(1-x_j), \forall j \quad (8)$$

$$\text{reachtime}_j - M^*(1-x_j) \leq st_j*(s_j+1) + M^*s_j, \forall j \quad (9)$$

Auxiliary Constraints:

These constraints helps in establishing the relationships between different variables. Constraint 10 records if run-time reduction is required for job j. Further, the constraints (11)-(13) are the equivalent of the non-linear constraint, $$cnt\_pr_j \geq 1-pr_j, \forall j \quad (10)$$

$$ayp_{jk}=y_{jk}*pr_k \quad (11)$$

$$ayp_{jk} \leq pr_k+M*(1-y_{jk}), \forall j,k \in PL(j) \quad (12)$$

$$(1-y_{jk})*M+ayp_{jk} \geq pr_k, \forall j,k \in PL(j) - y_{jk}*M+ayp_{jk} \leq 0, \forall j,k \in PL(j) \quad (13)$$

Wherein, the variable $ayp_{jk}$ captures the run-time reduction for job j if dependency between job j and k are not deleted. This value is required for reach-time calculation. Similarly, constraints (14)-(16) are the equivalent of the non-linear constraint.

$$rty_{jk}=y_{jk}*reachtime_k \quad (14)$$

$$rty_{jk} \leq reachtime_k+M*(1-y_{jk}), \forall j,k \in PL(j) \quad (15)$$

$$(1-y_{jk})*M+rty_{jk} \geq reachtime_k, \forall j,k \in PL(j) - y_{jk}*M+rty_{jk} \leq 0, \forall j,k \in PL(j) \quad (16)$$

Furthermore, the constraints (17)-(19) are equivalent of the non-linear constraint, $axz_j=x_j*z_j$ $$axz_j \geq x_j+z_j-1, \forall j \quad (17)$$

$$axz_j \leq x_j, \forall j \quad (18)$$

$$axz_j \leq z_j, \forall j \quad (19)$$

Henceforth, the obtained optimal solutions in the mathematical terms are translated into implementable actions such as either identifying the jobs that can be postponed to another batch or executing one or more jobs partially by reducing the workload or identifying the dependency of one or more jobs running on multiple cores simultaneously and that dependency can be relaxed or identifying one or more jobs whose from-time constraint can be relaxed.

Figure 3:
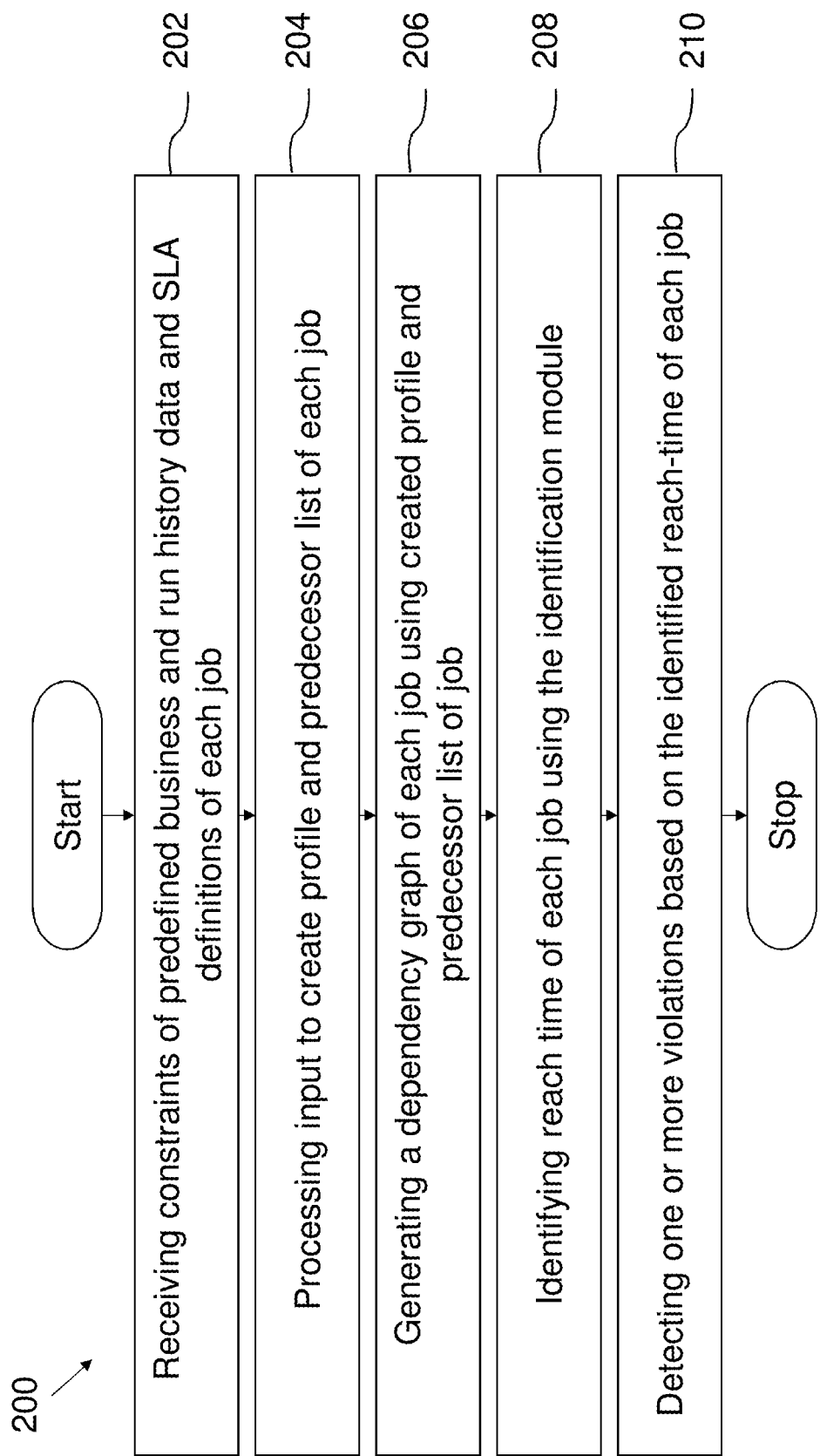
FIG. 3 illustrates a flow diagram showing a method for detecting one or more violations in managing service level agreements (SLA) in an information technology service management (ITSM) according to an embodiment of the present disclosure.

Referring FIG. 3, a method (200) for detecting one or more violations in managing service level agreements (SLA) of information technology service management (ITSM). A business processes of the ITSM are broken down into series of steps referred to as one or more jobs. Each job can only start after its predecessors have completed their execution. The business requirements define theses precedence relations among one or more jobs. In addition, the business requirement entail various constraints such as start-time, run-time, end-time etc.

In a complex business there could be multiple objectives such as efficiency, cost, compliance etc. In a systematic settings these objectives are often intertwined and there is a trade-off in meeting them. The service level agreements (SLAs) are very vital to the business processes of the ITSM. Herein, the SLAs are defined by measuring the start-time, run-time and end-time of each job of the business. Herein, to fulfill the business requirement, one or more SLA violations of each job of the business processes are being detected and a set of levers are identified that can be used to minimize the detected SLA violations of each job.

At the step (202), one or more constraints of the business, a run history data and one or more SLA definitions of each job of the business are received at a receiving module (106). The one or more business constraints are generally derived from the jobs relationships and requirements. A typical business constraint could be something like a job can start only after its defined from-time. Further, a job can start only after all its predecessors are completed etc. if the job or dependency among the one or more jobs is defined as constraint then it cannot be perturbed.

At the next step (204), the received one or more inputs are processed to create ensure data consistency, completeness and uniformity. The profile of each job is the collection of individual characteristics of each job that are useful in scheduling. Each job profile includes job name, run-time, from-time criticality and SLAs. The predecessor list of each job represents the dependencies among the one or more jobs. Each job can only start executing if all of its predecessor jobs are executed. It represents the relationship among the one or more jobs.

At the next step (206), a dependency graph of each job is generated at a generation module (110) using the created profile and predecessor list of each job. In the dependency graph each node represents a job and an edge represents the precedence relationship.

At the next step (208), wherein reach-time of each job is computed using a computing module (112) of the system. It is to be noted that the reach-time is defined as the earliest time epoch where a job can start execution.

At the last step (210), the process uses transactional history to derive a from-time constraint for identified root-nodes and identifies at least one job that is likely to be SLA non-compliant using computed reach-time and dependency graph of each job. Further, it compares reach-time and run-time of the each job with SLA definitions (start-time SLA and end-time SLA) to detect potential SLA violations.

In yet another embodiment, wherein the process generates a set of levers corresponding to each identified SLA violation of one or more jobs, using an integer linear programming technique and the output of processing module (108) of the system (100). It would be appreciated that the integer linear programming technique is a mathematical model which is applied wherein the objective and its constraints are linear, and decision variables are integer. Herein, objective is to optimize SLA non-compliance with minimal impact on business logic.

Therefore, the obtained optimal solutions in the mathematical terms are translated into implementable actions such as either identifying the jobs that can be postponed to another batch or executing one or more jobs partially by reducing the workload or identifying the dependency of one or more jobs running on multiple cores simultaneously and that dependency can be relaxed or identifying one or more jobs whose from-time constraint can be relaxed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for securely executing a transaction request using a communication channel.

The embodiments herein provides a method and system for detecting one or more violations in managing service level agreements (SLA) in an information technology service management (ITSM). A batch job system is characterized by the set of jobs and dependencies between jobs. Each job is in turn characterized by run-time, from-time and SLA definitions. SLAs can be of two kinds Start-time and End-time. Start-time SLA requires that the job execution starts before the specified time while End-time SLA necessitates that the job finishes its execution before the specified time. To optimize processing time required for executing one or more batch jobs the disclosure identifies SLA violations and solves them to produce a set of actionable levers.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example. The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system for detecting one or more violations in managing service level agreements (SLA) in an information technology service management (ITSM), wherein the system comprising:
   at least one memory with a plurality of instructions;
   at least one processor, wherein the at least one processor is communicatively coupled with the at least one memory;
   a receiving module configured to receive one or more constraints of a business, a run history data and one or more SLA definitions of each job of the business as one or more inputs to the system;
   a processing module configured to process the received one or more inputs to create a profile and a predecessor list of each job;
   a generation module configured to generate a dependency graph of each job using the created profile and the predecessor list of each job; and
   a computing module configured to compute reach-time of each job; and
   a detection module configured to detect one or more violations based on the computed reach-time of each job.

2. The system of claim 1, further comprising:
   an optimization module configured to generate a set of levers corresponding to each violation to minimize one or more detected violations using an integer linear programming technique and the output of processing module.

3. The system of claim 2, wherein the set of levers corresponding to each violation comprising a definite time by which the job may be preponed and a fraction of run-time of the job may be reduced.

4. The system of claim 1, wherein the one or more constraints comprising a precedence order of the one or more jobs of the predefined business and from-time of each job.

5. The system of claim 1, wherein the run history data of each job comprising start-time, end-time, from-time and run-time of each job.

6. The system of claim 1, wherein the predecessors list of each job represents the dependencies among the jobs of the ITSM.

7. A method for detecting one or more violations in managing service level agreements (SLA) of information technology service management (ITSM), wherein the method comprising:
- receiving one or more constraints of a predefined business, a run history data and one or more SLA definitions of each job as input;
- processing the received input at a processing module to create a profile and predecessor list of each job;
- generating, at a generation module, a dependency graph of each job using the created profile and predecessor list of each job;
- identifying reach-time of each job using an identification module; and
- detecting, at a detection module, one or more violations based on the identified reach-time of each job.

8. The method of claim 7, further comprising:
- generating, at an optimization module, a set of levers corresponding to each violation to minimize one or more violations using integer linear programming technique and output of pre-processing module.

9. The method of claim 8, wherein the set of generated levers corresponding to each violation comprising a definite time by which the job may be preponed and a fraction of run-time of the job may be reduced.

10. The method of claim 7, wherein the one or more constraints comprising a precedence order of the one or more jobs and from-time of each job.

11. The method of claim 7, wherein the run history data of each job comprising start-time, end-time, from-time and run-time of each job.

12. The method of claim 7, wherein the list of predecessors of each job represents the dependencies among the one or more jobs of the ITSM.

* * * * *